United States Patent [19]

Dougherty

[11] Patent Number: 5,037,214
[45] Date of Patent: * Aug. 6, 1991

[54] DOUBLE ROW TAPERED ROLLER BEARING ASSEMBLY

[75] Inventor: John D. Dougherty, North Canton, Ohio

[73] Assignee: The Timken Company, Canton, Ohio

[*] Notice: The portion of the term of this patent subsequent to May 6, 2007 has been disclaimed.

[21] Appl. No.: 161,969

[22] Filed: Feb. 29, 1988

[51] Int. Cl.⁵ .................. F16C 33/36; F16C 33/58; F16C 43/04

[52] U.S. Cl. .................. 384/571; 384/561; 384/564; 384/584; 384/589

[58] Field of Search ........ 384/506, 544, 548, 559–562, 384/564, 569–571, 584, 903, 620, 586, 589; 29/148.4 A, 148.4 R, 149.5 R

[56] References Cited

U.S. PATENT DOCUMENTS

| | | | |
|---|---|---|---|
| 1,911,336 | 5/1933 | Ackerman | 384/571 X |
| 2,037,982 | 4/1936 | Hughes | 384/506 |
| 3,420,589 | 1/1969 | Green et al. | 384/620 |
| 3,578,831 | 5/1971 | Scheifele | 384/571 |
| 3,583,511 | 6/1971 | Asberg | 180/70.1 |
| 3,589,747 | 6/1971 | Asberg | 380/96.1 |
| 3,704,498 | 12/1972 | Rundt | 384/571 X |
| 3,774,933 | 11/1973 | Asberg | 384/544 X |
| 3,937,539 | 2/1976 | Jones et al. | 384/571 |
| 4,333,695 | 6/1982 | Evans | 384/571 X |

Primary Examiner—Thomas R. Hannon
Attorney, Agent, or Firm—Gravely, Lieder & Woodruff

[57] ABSTRACT

A unitary bearing assembly having two rows of rolling elements between a first body with internal raceways angularly diverging from each other, and a second body formed with external raceways inclined toward each other, the bearing assembly being adapted for having either body connected to a wheel or to the vehicle body as may be selected, and in which a full complement of tapered rollers can be incorporated between the internal and external raceways, and a single rib ring fixed in position on one or the other of the inner or outer bodies to fully unitize the assembly.

2 Claims, 2 Drawing Sheets

DOUBLE ROW TAPERED ROLLER BEARING ASSEMBLY

BACKGROUND OF THE INVENTION

1. Field of the Invention

This invention is directed to unitizing and simplifying the components that go into assembly of the two-row tapered roller bearing for vehicle wheels and for other uses.

2. Description of the Prior Art

It is known in certain examples of the relevant prior art to provide vehicle wheel hubs with interfitted parts rotating relative to each other and double row ball bearings, with one of the parts designed to engage on a wheel shaft or spindle and the other part to connect up to a wheel and brake support. An early form of such an assembly is seen in U.S. Pat. No. 2,037,982 of Apr. 21, 1936. This was followed in 1968 by British Patents 1,254,552 and 1,254,553 which still adhered to a two row ball bearing hub having complicated multi-part components. The art in 1971 still continued to develop two row ball bearing hubs, as seen in U.S. Pat. Nos. 3,583,511 and 3,589,747, followed in 1973 by U.S. Pat. No. 3,774,933. All of these patents embodied multi-part assemblies which presented problems of manufacture of the parts and difficulty in obtaining adjustments because of the many parts and tolerance factors, all of which increased the cost.

The art also contains U.S. Pat. Nos. 3,420,589 of Jan. 7, 1969 and 3,578,831 of May 18, 1971 directed to a single row tapered roller bearing assembly which displayed a unitized bearing that could better withstand thrust in both directions on a shaft mounted in the bearing. The problem with this bearing is that the current thrust loads are far too great for a single row tapered roller set. Furthermore, there was at that time a problem of not being able, in going to a two row tapered roller assembly, to get a full complement of tapered rollers in each of two adjacent raceways. In addition, the prior art contains U.S. Pat. No. 3,704,498 of Dec. 5, 1972 which relates to pre-stressing a bearing rib and race prior to welding them into assembly.

BRIEF SUMMARY OF THE INVENTION

This invention presents a unique solution to making a two row roller bearing with the ability to have a full complement of rollers in each row, and to make the assembly in two simple unitary body parts with a single applied rib ring to unitize the assembly.

Certain advantages are obtainable from an assembly that is made up of a minimum number of parts which reduces cost of assembly and results in a favorable reduction in weight, and time to effect assembly is significantly reduced. Integration of several parts, that heretofore were thought to be essential, can reduce tolerance problems and complexity of fitting many separate parts into an assembly. A further advantage gained by the present invention is that the bearing can be totally pre-set at the factory, and a full complement of bearing rollers can be supplied in each row of rollers to increase bearing load capacity.

A preferred embodiment of the present invention comprises a unitary outer member with internal raceways angularly diverging from each other, a unitary inner body member having a sleeve formed with external raceways inclined toward each other. In certain cases the inner member is formed with a shaft receiving axial bore therethrough. A pair of tapered roller sets between the outer and inner members are adapted to contain a full complement of tapered rolling elements engaged between the internal and external raceways of the inner and outer members, while a single separately formed rib ring placed in position on and secured to either member to form an abutment for a row of tapered rollers and unitize the assembly.

The invention also resides in the construction and form of the principal unitary members to simplify the method of assembly of the unitary parts to result in a bearing of improved load bearing capacity and reduced cost of manufacture and factory setting of the assembled bearing. In addition, the fusing welding of the rib ring results in unitizing the bearing, and thereafter lubrication can be added.

BRIEF DESCRIPTION OF THE DRAWINGS

The present unitized bearing assembly is disclosed in the accompanying drawings, wherein.

DETAILED DESCRIPTION OF THE EMBODIMENT

Figure 1:
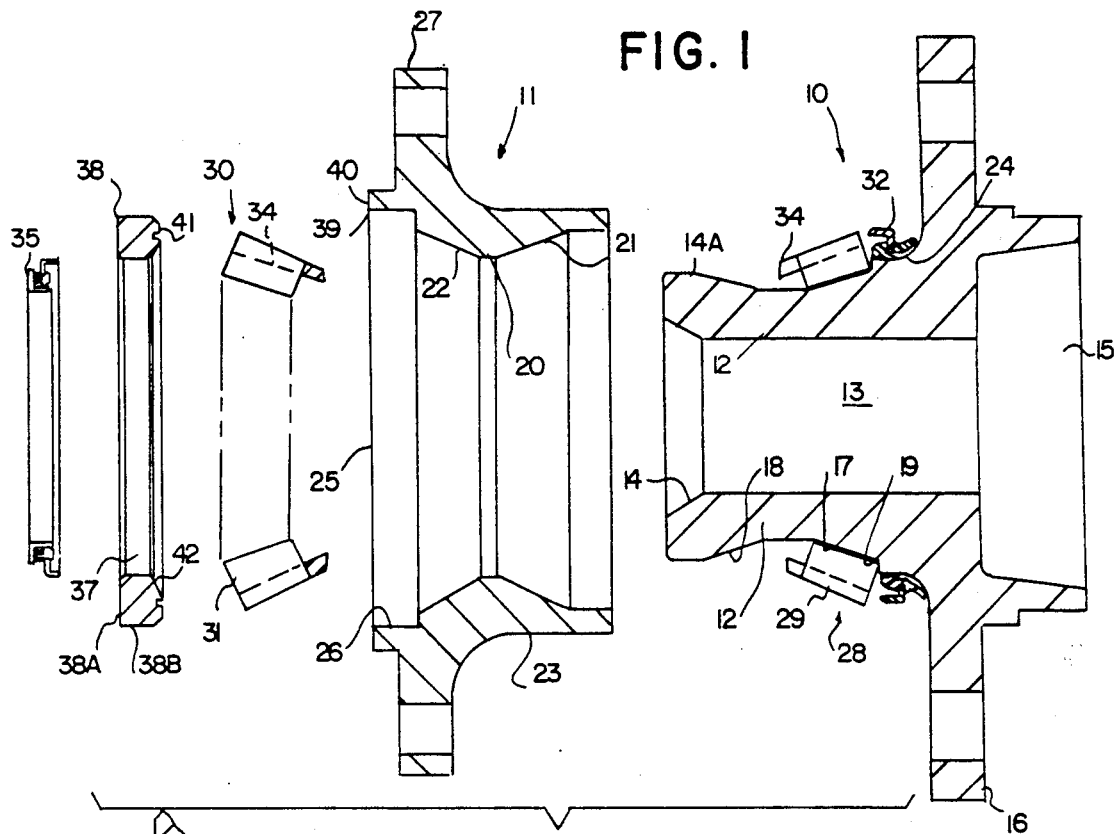
FIG. 1 is an exploded sectional view of the parts of a driven two row tapered roller bearing, the parts being in spaced position of assembly alignment.

One of the embodiments to be described hereinafter is adapted to form a vehicle wheel hub assembly. The principal parts of the assembly in FIG. 1 are the inner body 10 and an outer hollow body 11 which fits over the inner body to assume the assembly position seen in FIG. 2. The body 10 is adapted to be driven through the rotating spindle S to be seen in FIG. 2.

The inner body 10 provides an axially elongated member 12 having a mounting bore 13 open at one end at chamfer 14 and an annular shoulder, 14A, and the opposite end is formed with an opening into a shallow recess 15. The recessed end of the body bore 13 is formed with a circular flange 16 radially extending from the sleeve 12. The outer surface of the sleeve 12 is formed with a pair of raceways 17 and 18 which are inclined toward each other, and the raceway 17 terminates in an abutment shoulder 19.

The outer body 11 has a bore 20 that is axially shorter than the sleeve 12 of the inner body 10. The bore is formed with a pair of raceways 21 and 22 angularly diverging from each other. The end 23 of the body 11 projects axially beyond the raceway 21 to furnish a retaining surface for a lubricant seal between it and a surface 24 on the member adjacent the shoulder on the thrust rib 19. The open end 25 of the bore 20 opposite the end 23 is recessed at 26, and a radially outwardly extending circular flange 27 completes the form of the outer body 11.

A first row 28 of tapered roller bearing elements 29 is assembled, with a full set of roller elements, on the raceway 17 with the large end faces of the rollers running adjacent the abutment 19. A second row 30 of tapered roller elements 31 is assembled with a full set of roller elements (31) on the raceway 18 with the large end faces running adjacent the open end 25 of bore 20. How the assembly is made will now be described.

The first step in the method of assembly is to place an outboard seal 32 onto the surface 24, the seal including the usual seal case supported temporarily by a split removable backing ring (not believed necessary to show).

The second step of the method, with the inner body 10 and outer body 11 aligned as seen in FIG. 1, is to assemble the first row 28 of roller elements 29 along with the installation of finger type cage 34 to establish the tracking of the roller elements 29 on the raceway 17.

The third step of the method is to slide the bodies 10 and 11 toward each other until the raceway 21 in the bore 20 engages the first row 28 of the rollers 29. As this step progresses the end 23 on body 11 slides over the outboard seal 32 on surface 24. At this stage, the split backing ring can be removed as the seal case is now received in the end 23 of body 11. Then a full complement of tapered rollers 31 can be assembled between the raceway 18 on the inner body 10 and raceway 22 on the outer body 11, along with finger-type cage 34.

The next step of the method is to unitize the above described components of the assembly so the two rows 28 and 30 of tapered rollers 29 and 31 and the seal 32 are retained in operative positions. The unitizing of the components is effected by placing the rib ring 37 in the recess 26 to act as an abutment for the large ends of the second row 30 of tapered roller elements 31. The rib ring 37 must be secured by welding before the assembly is greased and sealed because the heat from the welding would destroy the seal.

The method of securing the ring 37 in position for unitizing the assembly is carried out by employing laser or electron beam welding of the corner 38 of ring 37 to the corner surface 39 of the open end 25 of the body 11. This is carried out employing materials for the body 11 and ring 37 of plain-carbon steel with the carbon content in the range of 0.15 weight percent to 0.85 weight percent, and a maximum of 0.015 weight percent of sulfur and 0.015 weight percent phosphorus. The ring 37 is press fitted into the cup recess 26. The ring 37 is induction hardened at the face 42 with the carburized layer removed at the surfaces 38a and 38b adjacent to the corner 38. The material of body 11, as noted above, is case carburized plain carbon steel that is induction hardened at the raceways 21 and 22, and with the carburized layer removed at the surfaces 26 and 40 adjacent to the corner 39. The carburized layer is removed because high carbon levels cause the weld to crack.

Figure 3:
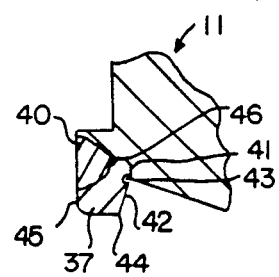
FIG. 3 is a fragmentary and enlarged portion of the assembly of FIG. 2 to schematically illustrate the securing of the rib ring in the assembly.

The view of FIG. 3 is intended to illustrate the characteristic of the welding securement of the ring 37 to the body 11. After the removal of the carburized layer from the areas adjacent the contiguous surfaces 39 on the body 11 and 38 on the ring 37, the laser or electron beam is directed to fuse these surfaces and effect a partial penetration weld which results in less residual stress in the weld. A preferred characteristic, seen in cross section through the ring 37 shown in FIG. 3, is to present an induction hardened abutment face 42 to the large end of the rollers 31, to provide a relief notch 43, and to have chamfered corners 44, 45 and 46.

An important aspect of the ring is the ability to control the bearing setting by grinding the inner face 41 by a predetermined amount prior to placement in the recess 26 and laser or electron beam weld securement. Other common welding practices cause assembly distortions of the ring and uncertain bearing setting, and lead to an undesirable amount of scrap products. The laser or electron beam welding methods allow for a highly localized heat penetration which greatly reduces problems with ring distortion and disturbances in bearing setting. Additionally, surface 42 of ring 37 and raceway 22 are likely to be tempered to undesirable hardness levels by heat dissipation through the components when using welding techniques other than laser or electron beam.

The final step of the method is to install a suitable seal 35 on the surface 14A of the body 10 which is aligned opposite to the position of the ring 37. Before installing the seal 35, lubricant is admitted to the assembly and is retained by the seals 32 and 35.

Figure 2A:
FIG. 2A is a fragmentary section of an alternate location for a rib ring.
Figure 2:
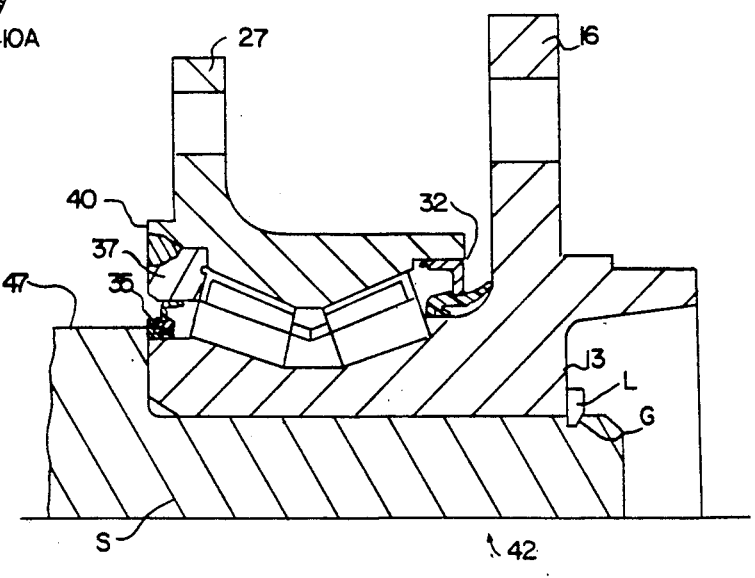
FIG. 2 is a sectional view of the unitized driven two row tapered roller bearing when fully assembled in its unitized condition and positioned on a shaft or spindle of a vehicle wheel.

Turning to FIG. 2A there is disclosed a fragmentary part of the assembly of FIG. 2 sufficient to show an alternate position of the rib ring 37 which is now fusion welded into the shouldered recess 37A of the inner body 10A (or cone). The outer body 11A (or cup) presents a surface 26A to receive one part 35A of a seal while the rest of the seal 35B is mounted on the rib ring 37. In this assembly the inner body 10A receives the rotating spindle S as seen in FIG. 2.

Figure 4:
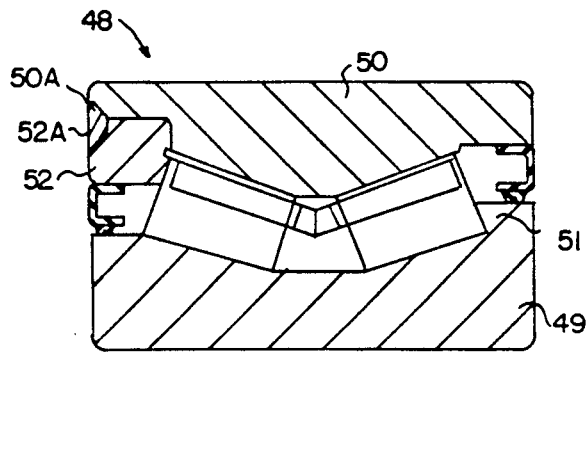
FIG. 4 is a sectional view of a modified two-row tapered roller bearing for applications to other than vehicle wheel mountings.

Turning now to FIG. 4 there is shown a modification in which the components of the bearing assembly 48 are designed to accommodate general applications for a two-row tapered roller bearing in which the assembly technique and method described for the embodiment of FIGS. 1 and 2 may be applied. In this modification, the inner body 49 and the outer body 50 do not have the flanges 16 and 27 of the assembly in FIG. 2. The assembly is retained in unitized position as the two rows of rollers are operably retained between the integral rib 51 on the inner body 49, and the welded rib 52 on the outer body 50. The surfaces 50A and 52A are thus joined.

The foregoing description has directed frequent attention to the view of FIG. 2. However, the parts identified by reference numerals in FIG. 1 are again identified in FIG. 2 by the same reference numerals so the assembly can be understood. It is believed unnecessary to apply all of the reference numerals in FIG. 2. FIG. 2 includes mounting the two-row bearing assembly on a shaft S which is removably secured in the bore 13 by the use of a snap lock ring L seated in a groove G near the outer end of the shaft S. The bearing assembly is thus held in abutment with the shoulder 47 on the enlarged portion of the shaft S.

Figure 5:
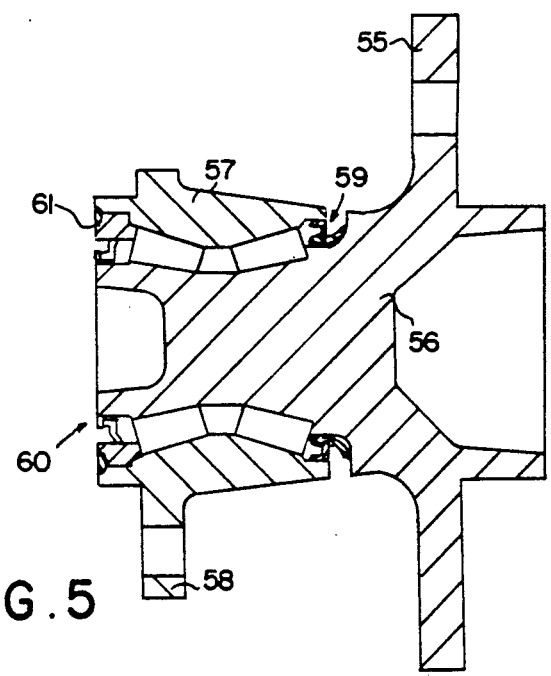
FIG. 5 is an assembly of a modified non-driven two row tapered roller bearing.

The fragmentary view of FIG. 5 discloses an assembly suitable for a non-driven wheel attached to the flange 55 of the cone or inner body 56. The cooperating cup or outer body 57 is adapted to be connected to a part of the vehicle frame by flange means 58. In this assembly the unitizing of the parts 56 and 57 with proper seals 59 and 60 is accomplished by the rib ring 61 which is fusion welded in position in the manner referred to in FIG. 3. Thus, a two-row roller bearing is provided to receive a full complement of rollers for substantially maximum load sustaining ability.

Figure 6:
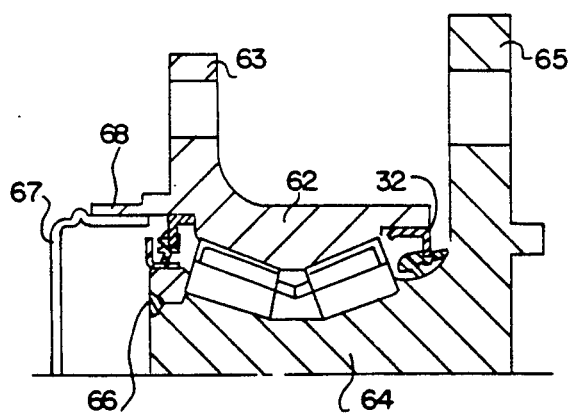
FIG. 6 is a fragmentary sectional view of a further modification of bearing assembly in a non-driven wheel arrangement.

In FIG. 6 there is shown an assembly for a non-driven wheel, wherein the wheel is connected to the outer body or cup 62 by flange means 63 and the inner body or cone 64 is attached by flange 65 to an adjacent part of the vehicle. Here the rib ring 66 is secured by fusion welding technique to the inner body 64 for unitizing the two-row bearing assembly. In this arrangement, grease is retained by means of a seal and a snap-on dust cap 67 telescoped into the annular extension 68 of the outer body 62.

The foregoing description has set forth the details of preferred embodiments of the invention, but it is understood that variations may come to mind without departing from a range of equivalent components that will satisfy the intended scope of the invention.

The present invention in its broad aspects is directed to unitizing a two-row tapered rolling bearing assembly in which the outer annular body is formed with an internal bore and the inner body is received in the internal bore of the outer body. The inner and outer bodies constitute unitary components of the bearing assembly. The inner body is formed on its outer cylindrical surface with a pair of raceways angularly inclined toward each other with a first one of the raceways terminating at an abutment shoulder while the remaining raceway terminates at an outwardly presented cylindrical surface. The outer body is formed with a pair of raceways angularly diverging from each other on the interior bore, and with a first one of the raceways terminating at an inwardly facing cylindrical surface while the remaining raceway terminates at an outwardly opening recess. There is a first set of tapered rollers positioned between the first raceways on the inner and outer bodies and with the large diameter ends of the tapered rollers present to the abutment shoulder of the inner body. A second set of tapered rollers is positioned between the remaining raceways on the inner and outer bodies with the large diameter ends presented toward the outwardly opening recess of the outer body. In order to unitize the foregoing assembly, a simple rib ring is fitted into the outwardly opening race of the outer body such that it has a surface presented to the large diameter ends of the second set of tapered rollers. The technique of securing the rib ring in its position in the outer body is of importance because the bearing assembly must be case hardened by carburizing in order to function satisfactorily as a bearing. The rib ring must also be case hardened since its surface presented to the tapered rollers must be wear resistant. It has been found that the most satisfactory way to secure the rib ring in position is to mechanically remove the carburized surface in the area where the rib ring and the adjacent outer body join so as to expose the underlying material for fusion welding. As pointed out above, the carburized layer is removed because high carbon levels cause the weld to crack. The fusion welding produces a highly localized heating during the fusing of the metals with a laser or electron beam so that there will be a minimum of distortion of the rib ring which would disturb the bearing setting, a reduction of the risk of undesired tempering of components and avoidance of cracking of the fused metal by reducing residual stress. The integrity of the weldment is further enchanced by selecting materials for the rib ring and outer bodies of plain carbon steels with the carbon content in the range of 0.15 to 0.85 percent by weight, and with a maximum content of 0.015 percent sulfur by weight and 0.015 percent phosphorus by weight. Furthermore, the adjacent surfaces of the rib ring and the outer body are not chamfered but have abutting surface to surface contact so that the contacting metal can be melted by fusion welding around the circumference of the rib ring. It should be pointed out that the carburized surfaces in the fusion welding areas are mechanically cleared away in the limited area to be fused. A full complement of tapered rollers can be assembled in each of the two rows and the rollers are maintained in proper operating positions by the use of finger type cages.

What is claimed is:

1. A unitized double row tapered roller bearing assembly of a first body formed with first and second tapered roller raceways in axially spaced relation and inclined toward each other to place the large diameter of said rollers remote from each other, said first body having an abutment shoulder adjacent the first one of said raceways, a second body surrounding said first body and being formed with first and second tapered roller raceways in axially spaced relation such that said first raceways on said first and second bodies are in cooperative alignment, the first and second raceways on said second body being axially spaced and angularly divergent, the first and second bodies receiving tapered rollers operatively arranged between said first and second raceways respectively, the improvement which comprises:

a marginal recess in one of said first or second bodies adjacent said second one of said cooperative raceways;

a thrust ring member press fitted into said marginal recess to be under circumferential stress within said recess, said thrust ring presenting a face surface to said tapered rollers arranged between said first and second bodies on said second one of said cooperative raceways; and weldment means structurally uniting said thrust ring member and said body having said recess for unitizing said bearing assembly.

2. The improvement set forth in claim 1 wherein said thrust ring member and said first and second bodies are composed of material having a content of carbon in the range of 0.15 to 0.85, a maximum content of 0.015 percent sulfur and 0.015 percent phosphorus, all by weight, to assure the integrity of said weldment means against failure therein.

* * * * *